(12) United States Patent
Isaji et al.

(10) Patent No.: US 7,343,235 B2
(45) Date of Patent: Mar. 11, 2008

(54) SAFETY DEVICE FOR A VEHICLE

(75) Inventors: Kazuyoshi Isaji, Kariya (JP); Hideki Kato, Nisshin (JP)

(73) Assignees: DENCO CORPORATION, Kariya (JP); Toyota Jidosha Kabushiki Kaisha, Toyota (JP)

( * ) Notice: Subject to any disclaimer, the term of this patent is extended or adjusted under 35 U.S.C. 154(b) by 274 days.

(21) Appl. No.: 10/540,264

(22) PCT Filed: Dec. 25, 2003

(86) PCT No.: PCT/JP03/16834

§ 371 (c)(1),
(2), (4) Date: Jun. 23, 2005

(87) PCT Pub. No.: WO2004/058546

PCT Pub. Date: Jul. 15, 2004

(65) Prior Publication Data

US 2006/0145463 A1    Jul. 6, 2006

(30) Foreign Application Priority Data

Dec. 26, 2002  (JP) .............................. 2002-377384

(51) Int. Cl.
*B60R 22/00* (2006.01)
(52) U.S. Cl. ........................ 701/45; 280/734; 180/268; 180/271; 340/436; 340/903
(58) Field of Classification Search .................. 701/45, 701/46, 47; 280/734, 735; 180/268, 271, 180/274; 340/435, 436, 903
See application file for complete search history.

(56) References Cited

U.S. PATENT DOCUMENTS

| | | | | |
|---|---|---|---|---|
| 3,893,703 | A | * | 7/1975 | Chika .......................... 280/753 |
| 5,964,478 | A | * | 10/1999 | Stanley et al. .............. 280/735 |
| 6,294,987 | B1 | | 9/2001 | Matsuda et al. |
| 6,859,731 | B2 | | 2/2005 | Takafuji et al. |
| 2004/0212189 | A1 | | 10/2004 | Kachu |

FOREIGN PATENT DOCUMENTS

| | | |
|---|---|---|
| EP | 931706 A1 | 7/1999 |
| JP | B2-2946995 | 10/1994 |
| JP | A-9-175327 | 7/1997 |
| JP | A-11-321496 | 11/1999 |
| JP | A-2002-2450 | 1/2002 |
| JP | A-2002-123898 | 4/2002 |
| JP | A-2003-165461 | 6/2003 |
| WO | WO 97/49578 | 12/1997 |

OTHER PUBLICATIONS

Notice of Preliminary Rejection from Korean Patent Office issued on May 29, 2006 for the corresponding Korean patent application No. 10-2005-7012038 (a copy and English translation thereof).
First Office Action from Chinese Patent Office issued on Sep. 29, 2006 for the corresponding Chinese patent application No. 2003801078041 (a copy and English translation thereof).
European Examination Report issued from the European Patent Office dated Sep. 5, 2007 in the corresponding European Application No. 03 786 341.2.

* cited by examiner

*Primary Examiner*—Gertrude A. Jeanglaude
(74) *Attorney, Agent, or Firm*—Posz Law Group, PLC

(57) ABSTRACT

In a passenger restraint device for an automotive vehicle, when the relative speed of the vehicle with respect to a crash object changes as a result of a driving maneuver of the vehicle performed before a crash, the actual crash time deviates from an estimated crash time calculated from the distance and the relative speed of the vehicle and the crash object. To resolve this, the actuation timing, actuation rise time and seat belt tension of a seat belt reeling-in device are varied on the basis of information relating to a deceleration rate that is a rate of decrease of the relative speed.

31 Claims, 4 Drawing Sheets

SAFETY DEVICE FOR A VEHICLE

CROSS REFERENCES TO RELATED APPLICATIONS

This application is a US national phase application of international application PCT/JP2003/016834, which was filed on 25 Dec. 2003.

TECHNICAL FIELD

This invention relates to a safety device for a vehicle that improves passenger protection by for example reeling in a seat belt when the vehicle is in great danger of a crash.

BACKGROUND ART

Passenger restraint devices have been known which actuate to restrain a passenger on the basis of pre-crash sensing. For example in a passenger restraint device disclosed in JP-A-9-175327, a seat belt reeling-in action is started when a time to a crash (available time before crash), which is the value obtained by dividing a distance to a crash object by a present value of relative speed, has become less than a predetermined threshold time set to at least be longer than a minimum time below which crash avoidance is impossible. In other words, this vehicle passenger restraint device starts a seat belt reeling-in operation to restrain the passenger at a point in time (actuation start time) ahead of an estimated crash time by the above-mentioned predetermined threshold time.

However, with this vehicle passenger restraint device, there has been the problem that when the actual crash time deviates from the estimated crash time as a result of a vehicle-driving operation for avoiding crash of the own vehicle before the crash, the vehicle passenger restraint device cannot be made to actuate with suitable timing.

Specifically, when as a result of such a vehicle-driving operation the crash time becomes earlier, there is a possibility of the crash occurring before the seat belt has been reeled in sufficiently (before a satisfactory tension has been applied to the seat belt). Conversely, when a tension is applied to the seat belt as early as possible with ample allowance to prevent this kind of problem, reeling-in of the seat belt occurs frequently in cases where it is possible to avoid a crash easily by a subsequent vehicle-driving operation. That is, in seat belt reeling-in of related art, because in the estimation of the estimated crash time the vehicle-driving operation has not been taken into account at all, there has been the possibility of this problem arising.

And, in a passenger restraint device of this kind, after the estimated crash time has passed it is desirable for the seat belt to be slackened, irrespective of whether or not a crash took place. To this end, after a fixed time (actuation time) has elapsed from the actuation start time, the seat belt reeling-in device is ordered to perform a slackening operation.

However, because a time which goes back by a predetermined threshold time from the estimated crash time is set as the actuation start time, when due to a change in the speed of the own vehicle accompanying a steering maneuver the actual crash time is later than the estimated crash time, there is a possibility of the seat belt slackening operation being started before the actual crash time. This problem can be solved by the time from the estimated crash time to the slackening start time being set long. However, with this kind of solution there is the possibility of giving the passenger a disconcerting feeling.

And, a seat belt reeling-in device (passenger restraint device) of related art is set so that reeling-in is always executed with a fixed actuation rise time (current pattern) However, in cases such as that of an accident caused by a vehicle suddenly pulling out, it is conceivable that at the stage at which the danger of an accident is recognized and an estimated crash time is calculated, already it may not be possible to secure an actuation rise time adequate for a sufficient tension to be applied to the seat belt. In cases like this, it is desirable for the motor of the seat belt reeling-in device to be operated at full load and for reeling-in of the seat belt to be carried out at maximum speed. However, when reeling-in is always carried out at maximum speed, problems such as the passenger being given a disconcerting feeling and the consumed electrical power increasing arise.

Also, in a seat belt reeling-in device (passenger restraint device) of related art, a fixed tension is applied to the seat belt at all times after reeling-in. However, in practice, crash danger situations in which seat belt reeling-in is carried out include various cases, such as for example situations not thought to be very dangerous, situations in which the driver can avoid a crash easily, emergency situations in which a crash has already become unavoidable and so on. Therefore, in the related art, when as the fixed tension a maximum tension is always applied after reeling-in of the seat belt, there will be cases when the driver is given a disconcerting feeling. On the other hand, when the tension applied to the seat belt after reeling-in is made lighter, there is the problem that the necessary passenger protection is not obtained.

This invention was made in view of the problems discussed above, and it is an object of the invention to provide a vehicle safety device with which it is possible to realize an optimal passenger protection action while keeping disconcerting of the passenger to a minimum by suitably altering the passenger protection timing and passenger protection operation in correspondence with changes in the traveling state of the vehicle.

DISCLOSURE OF THE INVENTION

First through fourth aspects of the invention include as a basic construction a distance information detecting element for detecting a distance to a crash object and a relative speed relative to the crash object, a passenger protection element for lightening crash damage by completing a transition to a passenger protecting state after a predetermined actuation rise time elapses from an actuation start time, and a calculation and control element for ordering a start of actuation with as the actuation start time the time at which an available time before crash that is the time to an estimated crash time calculated on the basis of the detected distance and relative speed falls to a predetermined threshold time set to be longer than the actuation rise time. Consequently, normally it is possible for the actuation of the passenger protection element to be completed before the estimated crash time, and the passenger can be protected at the time of the crash. And, because the start of actuation of the passenger protection element is not carried out until the available time before crash reaches the threshold value time, it is possible to prevent the passenger being subjected to a disconcerting feeling.

Also, a vehicle passenger restraint device according to the first aspect of the invention is provided with a deceleration rate information detecting element for detecting deceleration rate information relating to a deceleration rate that is the rate of change (rate of decrease) of the relative speed. The calculation and control element corrects the actuation start time of the passenger protection element on the basis of the deceleration rate information. Specifically, when the deceleration rate is high the actuation start time of the passenger protection element is made later than when the deceleration rate is low. Consequently, even when the travel state of the vehicle changes and the actual crash time deviates from the estimated crash time, the actuation start timing of the passenger protection element can be changed suitably. As a result, an optimal passenger protection operation can be realized while disconcerting of the passenger is kept to a minimum.

Thus, in the first aspect of the invention, the actuation start time of the passenger protection element is corrected on the basis of information relating to the rate of change (rate of deceleration) of the relative speed of the own vehicle and the crash object. When various maneuvers to avoid a crash are carried out by the driver by the actuation start time of the passenger protection element, the actual crash time deviates from the estimated crash time. Consequently, the available time before crash (the time from the present time to the estimated crash time) and the optimal actuation start time (the time at which the available time before crash has fallen to the threshold value time) also fluctuate. In the first aspect of the invention, because the actuation start time is corrected on the basis of information relating to the deceleration rate, an optimal actuation start time can be set at all times.

Because the deceleration rate is defined as the rate of change (rate of decrease) of the relative speed of the own vehicle with respect to the crash object, when the deceleration rate is high, it means that the relative speed is decreasing more rapidly. And if the relative speed that is the speed difference between the own vehicle and the crash object decreases, the crash time becomes later. Therefore, by the actuation start time of the passenger protection element being made later when the deceleration rate is high compared to when it is low, it is possible for the actuation start time to be adapted to the actual crash time.

A vehicle passenger restraint device according to the second aspect of the invention is provided with a deceleration rate information detecting element for detecting deceleration rate information relating to a deceleration rate that is the rate of change (rate of decrease) of the relative speed. The calculation and control element corrects the actuation stop time of the passenger protection element on the basis of the deceleration rate information. Specifically, when the deceleration rate is low, the actuation stop time of the passenger protection element is made earlier compared to when it is high. Consequently, it is possible for the actuation stop time of the passenger protection element to be changed suitably in correspondence with change in the traveling state of the vehicle. Accordingly, an optimal passenger protection operation can be realized while disconcerting of the passenger is kept to a minimum.

Thus, with the second aspect of the invention, the actuation stop time of the passenger protection element is corrected on the basis of information relating to the deceleration rate of the relative speed of the own vehicle with respect to the crash object. Consequently, even when various crash avoidance maneuvers carried out by the driver by the actuation start time of the passenger protection element cause the actual crash time to deviate from the estimated crash time, it is possible for an optimal actuation stop time corresponding to that deviation to be set.

With respect to this, in a passenger restraint device of related art, the actual crash time deviating from the estimated crash time due to the above-mentioned crash avoidance maneuvers is not anticipated. Consequently, there is a possibility of the problem arising that the actuation of the passenger protection element stops before the actual crash time as a result of delaying of the actual crash time. And when to avoid this kind of problem the actuation stop time is set unnecessarily long, the problem may arise that even in a situation where actuation of the passenger protection element is no longer necessary that actuation continues. With this second aspect of the invention, it is possible to eliminate this kind of problem. In particular, when the deceleration rate is low, that is, when the relative speed of the own vehicle with respect to the crash object is still high, because the outcome of a crash or a crash being avoided arises relatively quickly, the actuation stop time of the passenger protection element is made earlier.

A vehicle passenger restraint device according to a third aspect of the invention is provided with a deceleration rate information detecting element for detecting deceleration rate information relating to a deceleration rate that is a rate of change (rate of decrease) of the relative speed. The calculation and control element adjusts the strength of the protection actuation of the passenger protection element in correspondence with the deceleration rate. Specifically, when the deceleration rate is high it makes the protection actuation of the passenger protection element stronger compared to when it is low. Consequently, it is possible for the strength of the protection actuation of the passenger protection element to be suitably changed in correspondence with change of the vehicle travel state. As a result, an optimal passenger protection operation can be realized while disconcerting of the passenger is kept to a minimum.

That is, with the third aspect of the invention, on the basis of information relating to the deceleration rate of the relative speed of the own vehicle with respect to the crash object, when the deceleration rate is high it is inferred that the danger of a crash is greater and the protection actuation of the passenger protection element is strengthened. Accordingly, because it is possible for the passenger protection operation to be strengthened selectively in correspondence with the danger of a crash, a good passenger protection operation can be realized while disconcerting of the passenger is kept to a minimum.

A vehicle passenger restraint device according to a fourth aspect of the invention is provided with the calculation and control element adjusts a rise time of the passenger protection element in correspondence with the available time before crash. Specifically, when the available time before crash is short, it shortens the rise time of the passenger protection element compared to when it is long. Consequently, the passenger protection timing and passenger protection operation can be changed suitably in correspondence with changes in the vehicle travel state, and it is possible to realize an optimal passenger protection operation while keeping disconcerting of the passenger to a minimum.

That is, with the fourth aspect of the invention, when it can be deduced that the available time before crash is amply long from an estimated crash time obtained from a distance and a relative speed or additionally taking into account a deceleration rate, the actuation rise of the passenger protection element is carried out slowly. Conversely, when the estimated crash time is imminent and it is determined that the available time before crash is short, actuation rise of the passenger protection element is carried out rapidly. By this means it is possible to complete passenger protection swiftly when the available time before crash, i.e. the time to the estimated crash time, is not ample, as in cases such as pulling-out accidents. When on the other hand the available time before crash is amply long, by actuation rise being effected slowly, the actuation rise can be carried out without the passenger being disconcerted, and the feeling experienced by the passenger can be improved.

The actuation rise time of the passenger protection element is the time from when the actuation of the passenger protection element is commanded to when the passenger protection element finishes the passenger protection operation. It is well-known that an actuation delay of this kind, namely a rise time, exists in all electrically actuated devices.

In the fourth aspect of the invention described above, a deceleration rate information detecting element for detecting deceleration rate information relating to a deceleration rate that is a rate of change (rate of decrease) of the relative speed may be provided and the calculation and control element constructed to shorten the actuation rise time of the passenger protection element when the deceleration rate is high compared to when it is low. By this means it is possible for the passenger protection element to be made to shift to an actuation-completed state rapidly when it is inferred that the deceleration rate is high and the danger of a crash is great.

Other characteristics and valuable effects of the invention will become clear from the following description of a preferred embodiment using drawings.

BEST MODE FOR CARRYING OUT THE INVENTION

Figure 1:
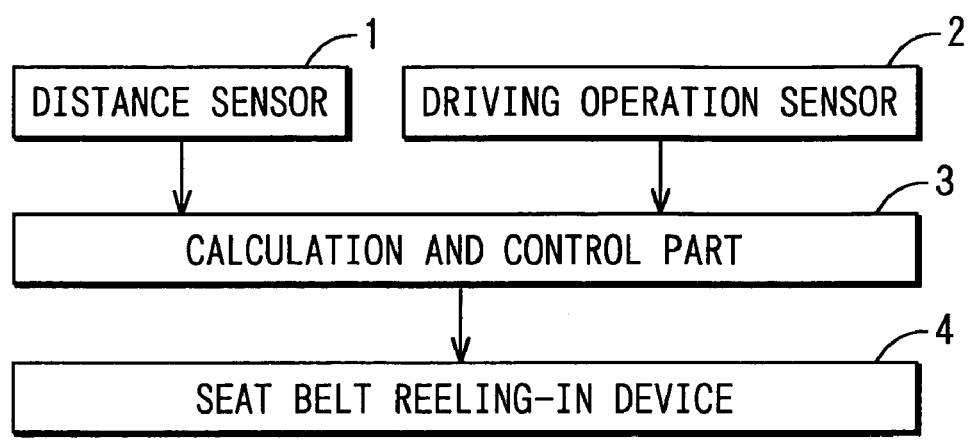
FIG. 1 is a block diagram showing the construction of a vehicle safety device in a preferred embodiment of the invention.

First, the basic construction of a vehicle safety device pertaining to the first through fourth aspects of the invention set forth above will be described. A vehicle safety device pertaining to the first through fourth aspects of the invention has a distance information detecting element for detecting the distance to a crash object and a relative speed relative to that crash object, a passenger protection element for lightening crash damage by completing a transition to a passenger protecting state after a predetermined actuation rise time elapses from an actuation start time. The vehicle safety device further includes a calculation and control element for ordering the start of actuation when an available time before a crash, which is the time to an estimated crash time calculated on the basis of the detected distance and relative speed, falls to a predetermined threshold time. The predetermined threshold time is set to be longer than the actuation rise time.

As the distance information detecting element, a radar type distance measuring device that emits electromagnetic waves, sound waves or laser light at the crash object and receives the reflected waves and calculates a distance from the time from emission to reception of the waves, or an image pickup type distance measuring device that picks up an image of the crash object and processes the image to calculate the distance can be employed. Because the distance measuring devices of this kind are well known, detailed descriptions of the devices are omitted. The relative speed can be computed from difference information of periodically obtained distance information. It is desirable for known FMCW (Frequency Modulation Continuous Wave) type millimeter wave radar to be used as the distance information detecting element, because then it is possible for the distance to the crash object and the relative speed to be detected simultaneously.

As the passenger protection element, besides known seat belt reeling-in devices that apply a predetermined level of tension to a seat belt, it is possible to employ any device that provides a passenger protection effect during a crash. A seat belt reeling-in device normally has a motor as means for reeling in the seat belt and creating a tension. However, as long as the function of increasing the tension of the seat belt is achieved, other means may be employed.

The calculation and control element is provided in the form of an ordinary microcomputer unit. However, to make the control operation high-speed, special computing circuits and memory circuits may alternatively be added. Or, the calculation and control element may be made up of a dedicated digital logic circuit. The calculation and control element calculates an estimated crash time or a signal logically equivalent to that (for example an available time before crash) on the basis of at least a distance and a relative speed. Also, the calculation and control element determines on the basis of the estimated crash time or equivalent signal whether or not the time to the estimated crash time (the available time before crash) has reached or fallen below a threshold value time. When it determines that the time to the estimated crash time has reached or fallen below the threshold value time, the calculation and control element commands the passenger protection element to perform a passenger protection operation for at least a fixed time. The threshold time must be set to be at least longer than the actuation rise time from when the actuation of the passenger protection element starts to when a transition to the passenger protection state completes. And the above-mentioned fixed time for which the passenger protection element performs the protection operation is of course set so that the protection operation finishes at least later than the estimated crash time estimated at the time when the passenger protection element was commanded to start actuating.

It is also possible to make the own vehicle a reference point (origin) in time-space and predict from the travel history of the crash object a subsequent relative locus of the crash object and to compute the time at which this relative locus reaches the reference point as the estimated crash time. This time-space is expressed with two distance dimensions x (for example the vehicle forward direction) and y (the vehicle left-right direction) and a time dimension t. In the time-space with the own vehicle as a reference point, the distance to the crash object is shown as the distance from the reference point (origin) to the coordinate point of the crash object in the x-y plane, and the relative speed is expressed as a differential of this distance. In other words, of the velocity components in the distance directions, that is, the relative velocity vectors of the crash object in the x-y plane, the relative speed is expressed by the vector components in the direction toward the origin.

The deceleration rate in the invention essentially means the differential of the relative speed, i.e. the actual second differential of the distance or a quantity having a positive correlation with the second differential of the distance. This deceleration rate constitutes information relating to the deceleration rate in the invention. However, the calculation of the distance measurement and the relative speed by the distance information detecting element sometimes may take time. Because of this, alternatively a vehicle-driving operation of a driver (driving control quantity, or a change therein) having an effect on the speed component in the direction connecting the own vehicle and the crash object, or a vehicle state arising as a result of that (a state quantity of a vehicle-driving apparatus, the acceleration/deceleration state of the vehicle, or a change therein) may be detected with some sort of vehicle-mounted sensor, and this then used as the information relating to the deceleration rate. In this case, because information relating to deceleration rate is acquired on the basis of the vehicle-driving operation of the driver carried out before the crash to avoid the crash or lighten the crash damage, the necessary information can be obtained with good response.

Specifically, the deceleration rate information detecting element may be an element including at least one among a brake depression sensor for detecting the depression amount of a brake pedal, a vehicle-mounted brake pressure sensor for detecting a brake pressure, a vehicle-mounted acceleration sensor for detecting the deceleration rate of the own vehicle, a vehicle-mounted yaw rate sensor for detecting a yaw rate, or a vehicle-mounted steering angle sensor for detecting a steering angel signal. Also, the deceleration rate information detecting element may have an accelerator pedal depression sensor for detecting the depression amount of an accelerator pedal, or a throttle angle sensor for detecting the angle of a throttle valve.

For example, when a braking operation is carried out the deceleration rate changes, and this can be detected from the depression amount of the brake pedal, the brake pressure, the deceleration, or changes in these. And when a steering operation is carried out, because the forward direction of the own vehicle changes, the deceleration rate, which is the rate of change of the relative speed in the distance direction, changes. This steering operation can be detected from the yaw rate or the steering angle or changes in these. Also, an accelerator pedal operation causes the own vehicle to accelerate or to be slowed down by engine braking, and so change the deceleration rate. This change in deceleration caused by an accelerator pedal operation can be detected from the accelerator pedal depression amount or the angle of the throttle valve or a change in these.

If actuation timing control and actuation level control of the passenger protection element are carried out on the basis of a vehicle-driving operation of the own vehicle or a vehicle state arising from that detected by means of vehicle-mounted sensors, for example compared to a case of carrying out differential processing to the relative speed, the response is better.

Next, a preferred embodiment of a vehicle safety device according to the invention will be described. FIG. 1 is a block diagram showing the construction of a preferred embodiment of a vehicle safety device. This vehicle safety device is made up of a distance sensor 1 corresponding to the distance information detecting element referred to in the invention, a vehicle-driving operation sensor 2 corresponding to the deceleration rate information detecting element, a calculation and control part 3 corresponding to the calculation and control element, and a seat belt reeling-in device 4 corresponding to the passenger protection element.

The distance sensor 1 is made up of a camera mounted on the front of the vehicle body for picking up a forward view, and an image processor for processing frame images outputted from this camera at a predetermined frame rate and outputting the presence/absence of a crash object and the distance to the crash object and a relative speed to the calculation and control part 3. That is, the image processor extracts from the frame image from the camera a crash object that is an object into which there is a possibility of the own vehicle crashing. At this time, if it extracts a crash object, it calculates the distance to the crash object and a relative speed from a change in the calculated distance. Then, it outputs the presence/absence of a crash object, the distance and the relative speed to the calculation and control part 3 in the form of a digital signal. The distance sensor 1 may alternatively be replaced with another device having equivalent capability, such as a radar system.

The vehicle-driving operation sensor 2 includes five sensors: a brake pressure sensor, an acceleration sensor, a yaw rate sensor, a steering angle sensor and an accelerator pedal sensor. However, it may alternatively be made up of one or more of these. Also, any sensor that detects vehicle driving maneuvers that change the speed vectors of the vehicle in a two-dimensional space on the road on which the vehicle is traveling or detect information relating to the results of such vehicle driving maneuvers may be employed. The vehicle-driving operation sensor 2 outputs the detected data to the calculation and control part 3 in the form of a digital signal.

The calculation and control part 3 controls the operation of the seat belt reeling-in device 4 on the basis of the distance data and relative speed data inputted from the distance sensor 1 and the information relating to deceleration rate inputted from the vehicle-driving operation sensor 2. The relative speed is determined as a change per unit time in the distance, and this calculation may alternatively be carried out in the calculation and control part 3 instead of the distance sensor 1.

The seat belt reeling-in device 4 is made up of a seat belt reeling-in mechanism, a reversible motor for reeling in and slackening the free end of a seat belt in the seat belt reeling-in mechanism, and a current control device for applying to the motor an electrical current value corresponding to an input command. Because this seat belt reeling-in device 4 is already well known it will not be described in detail here.

Figure 2:
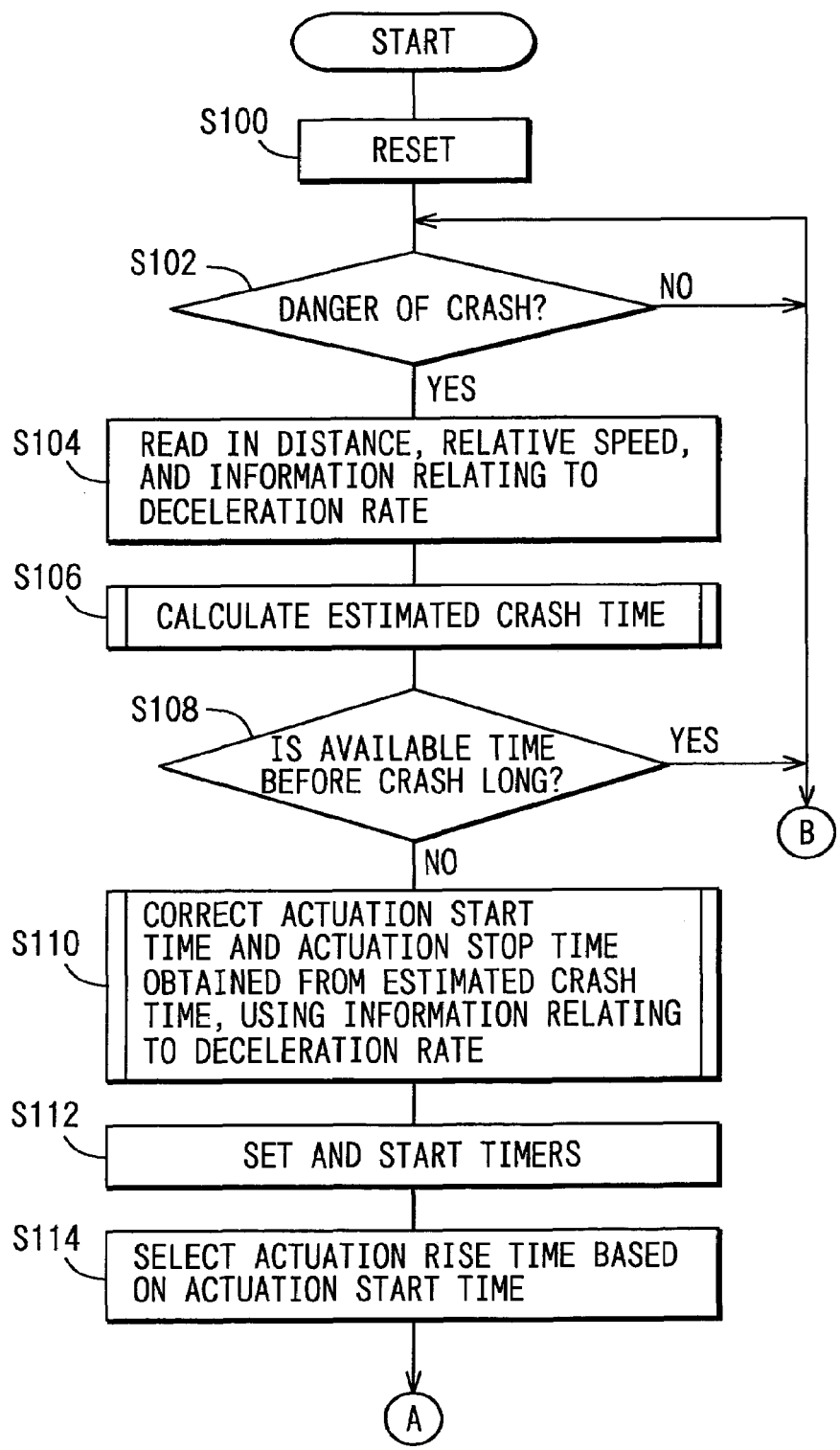
FIG. 2 is a part of a flow chart showing control operation of a calculation and control part of FIG. 1.
Figure 3:
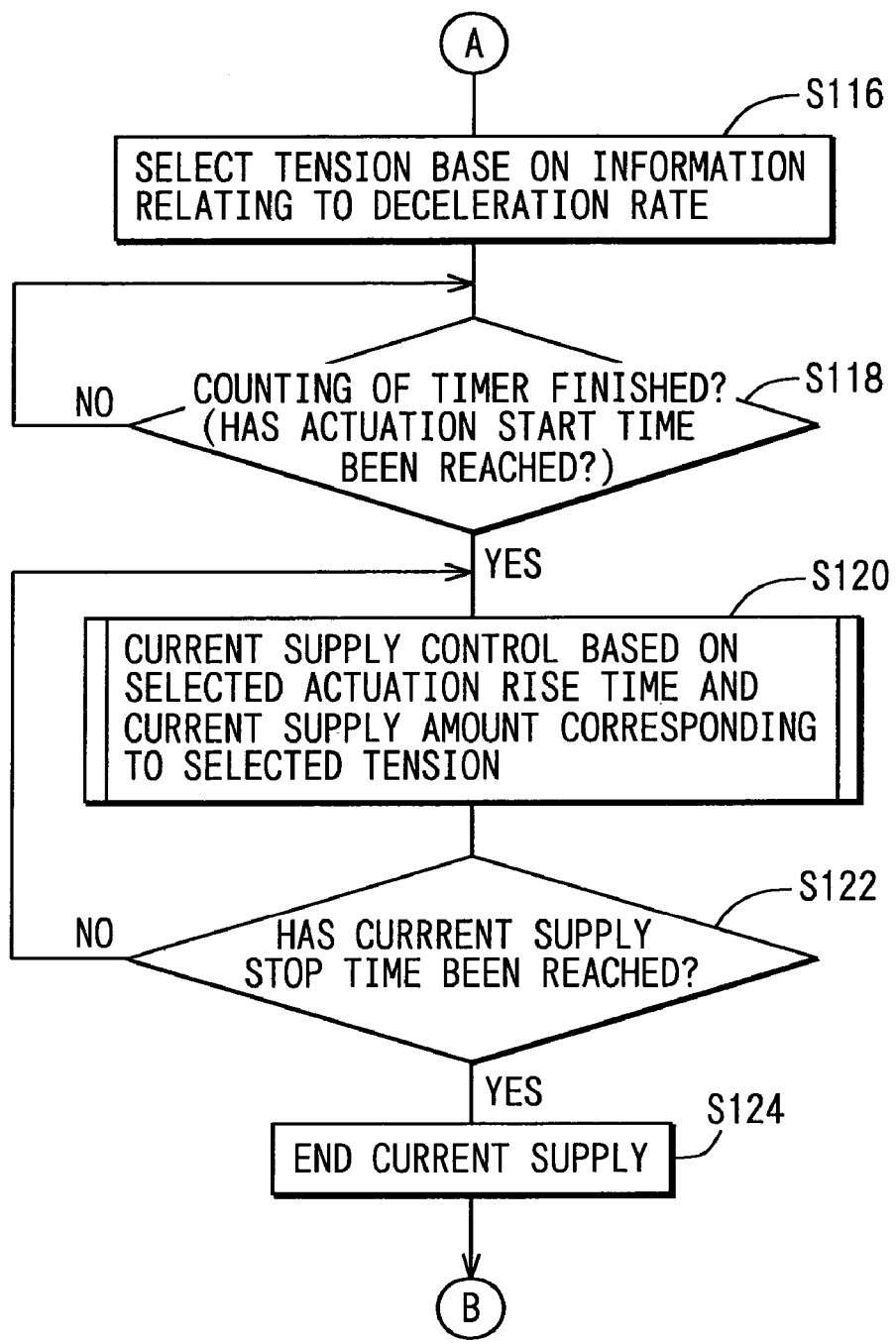
FIG. 3 is the remainder of the flow chart showing the control operation of the calculation and control part of FIG. 1.

Next, an example of a control operation of this vehicle safety device will be described. This control operation is executed mainly by the calculation and control part 3. FIG. 2 is a flow chart showing the control operation executed by the calculation and control part 3, and the following description refers to this flow chart.

First, resetting is carried out (step S100), and then on the basis of data inputted from the distance sensor 1 it is determined whether or not there is a crash object in a crash danger range (step S102). At this time, when it is determined that there is a crash object in the crash danger range, processing proceeds to step S104 and reads in distance data and relative speed data relating to that crash object from the distance sensor 1 and reads in information relating to deceleration rate from the vehicle-driving operation sensor 2.

The information relating to deceleration rate referred to in this preferred embodiment means information relating to a vehicle-driving operation having an effect on the deceleration rate or information relating to a vehicle state arising as a result of such a vehicle-driving operation. That is, in this preferred embodiment, as the vehicle-driving operation sensor 2 there are provided a brake pressure sensor, an acceleration sensor, a yaw rate sensor, a steering angle sensor and an accelerator pedal sensor, and a brake pressure, an acceleration (deceleration G), a yaw rate (vehicle angular velocity), a steering angle, and an accelerator depression amount read in from the various sensors are used as the information relating to deceleration rate.

Next, an estimated crash time is calculated on the basis of the data read in (S106). This estimated crash time is calculated for example by dividing the distance to the crash object by the relative speed relative to the crash object.

Then, it is determined whether or not an available time before crash, which is the time from the present time to the estimated crash time, is greater than a first threshold value time obtained by adding a predetermined time to an actuation rise time, which is the time from when the seat belt reeling-in device 4 starts actuating to when it creates a required predetermined tension (S108). If the available time before crash is greater than the first threshold value time, because it is not necessary to shift to passenger restraint control immediately, processing returns to step S102. When the available time before crash is below the first threshold value time, processing proceeds to step S110 to shift to a preparatory stage of passenger restraint control.

In step S110, an actuation start time that is the time going back by a predetermined second threshold value time from the estimated crash time and an actuation stop time that is the time advancing by a predetermined third threshold value time from the estimated crash time are calculated. Also, the actuation start time and the actuation stop time are corrected on the basis of the information relating to deceleration rate. The time from the actuation start time to the actuation stop time corresponds to the actuation time of the seat belt reeling-in device 4. The second threshold value time is set to be greater than the normal actuation rise time of the seat belt reeling-in device 4.

The correction of the actuation start time and the actuation stop time with the information relating to deceleration rate will now be described specifically.

First, concerning the correction of the actuation start time, when it is inferred from the information relating to deceleration rate that a vehicle-driving operation having a positive correlation with an increase of the deceleration rate of the relative speed has been carried out, the actuation start time is delayed in correspondence with the amount of the vehicle-driving operation and/or a vehicle state amount resulting from the vehicle-driving operation. For example, the greater is the brake pressure read in, and/or the greater is the deceleration read in, the more it can be deduced that the deceleration rate of the relative speed has increased and the crash will be delayed. Similarly, also when a yaw rate or a steering angle in a direction such that the own vehicle and the crash object move away from each other have arisen, it can be determined that the deceleration rate of the relative speed has increased and the crash will be delayed.

Conversely, when it is inferred from the information relating to deceleration rate that a vehicle-driving operation such that the deceleration rate of the relative speed increases in the minus direction has been carried out, the actuation start time is brought forward in correspondence with the amount of the vehicle-driving operation and so on. For example, when the accelerator pedal is depressed, it can be determined that the crash will occur sooner in correspondence with the amount of that depression. And similarly also when a change of yaw rate or steering angle in a direction such that the own vehicle and the crash object move closer to each other has occurred, the crash will happen earlier.

As the information relating to deceleration rate, not the actual size of the brake pressure, deceleration, yaw rate and steering angle or the like, but rather changes in those before the actuation start time may be calculated, and the actuation start time corrected on the basis of those calculated changes. Although the detected values mentioned above also have a correlation with the deceleration rate that is the rate of change of the relative speed, changes in those detected values have a higher correlation with the deceleration rate. For example, when before the actuation start time the brake pressure has changed in the increasing direction, it can be presumed that thereafter also increasing of the brake pressure will continue, and as a result the deceleration rate will increase. Conversely, even if the brake pedal is being depressed, if the brake pressure is changing in the decreasing direction, it can be presumed that the deceleration rate will increase in the minus direction. Accordingly, by correcting the actuation start time on the basis of changes in the detected values mentioned above, it is possible to make the actuation start time adapt to the actual crash time more accurately.

The correction of the actuation stop time is also carried out in the same way as the correction of the actuation start time described above. For example, when the deceleration rate is large compared to when the deceleration rate is small the estimated crash time is later. Accordingly, in the same way as the delay in the actuation start time, the actuation stop time is also delayed. The delay times of the actuation start time and the actuation stop time are for example set to be equal.

Alternatively, instead of the actuation start time and the actuation stop time being corrected directly, the above-mentioned estimated crash time may be corrected on the basis of the information relating to deceleration rate and the actuation start time and the actuation stop time thereby corrected indirectly. That is, the time going back by the second threshold value time from a corrected estimated crash time is set as the actuation start time, and the time advancing by the third threshold value time therefrom is set as the actuation stop time. In this case, the actuation start time and the actuation stop time are shifted by the amount by which the estimated crash time is corrected.

Or, just the actuation start time may be corrected by the method described above, and the actuation stop time may be obtained by adding a predetermined actuation time of the seat belt reeling-in device 4 to the corrected actuation start time. In this way also it is possible to correct the actuation stop time in correspondence with the size of the deceleration rate.

After that, a start timer for determining whether or not the actuation start time has been reached is set to the time to the corrected actuation start time. Also, a stop timer for determining whether or not the actuation stop time has been reached is set to the time to-the corrected actuation stop time. Then, counting of the start and stop timers is started (S112). After that, the actuation rise time of the seat belt reeling-in device 4 is set in correspondence with the time to the actuation start time (S114).

In this preferred embodiment, to make the description simple, the actuation rise time of the seat belt reeling-in device 4 can be set to two levels, an ordinary time and a short time. For setting this actuation rise time to either the ordinary time or the short time, the time to the actuation start time is compared with a predetermined fourth threshold value time. That is, it is determined whether or not the available time before crash to the estimated crash time is above a time obtained by adding a predetermined fourth threshold value time to the actuation start time. When the time to the actuation start time is greater than the fourth threshold value time, there is more than enough time for the actuation rise of the seat belt reeling-in device 4 to complete. Because of this, the actuation rise time is set to the ordinary time.

In this case, the rate of increase of a current supplied to the motor of the seat belt reeling-in device 4 (in the reeling-in direction) is set so that the current increases relatively gently. As a result, the reeling-in speed of the seat belt is a low speed, and the tension of the seat belt increases at a relatively low rate of increase.

With respect to this, if the time to the actuation start time is less than the fourth threshold value time, the actuation rise time is set to a short time which is shorter than the ordinary time. In this case, for example the maximum current possible is supplied to the motor of the seat belt reeling-in device 4 from the start of current supply. As a result, the current supply to the motor increases rapidly and the seat belt reeling-in speed is a high speed, and the tension of the seat belt also increases at a maximum rate of increase.

The fourth threshold value time mentioned above is set to a positive value including 0. The reason for the fourth threshold value time including 0 is as follows. The actuation start time is set to a time that goes back by at least a normal actuation rise time of the seat belt reeling-in device 4 from the estimated crash time. Therefore, if there is time before the actuation start time, reeling-in completes by the estimated crash time even if the seat belt is reeled in at the normal actuation rise time.

Instead of the actuation rise time being set to one of two levels as described above, alternatively it may be set to any of three levels or continuously. An example in which the actuation rise time of the seat belt reeling-in device 4 is set continuously will be described now. When the time to the actuation start time is equal to or greater than the fourth threshold value time, the actuation rise time is set to an ordinary time in the same way as in the example described above. And when the time to the actuation start time is less than the fourth threshold value time, the time difference between the time to the actuation start time and the fourth threshold value time is calculated, and the actuation rise time is set shorter the greater is that time difference.

In the example described above, the actuation rise time of the seat belt reeling-in device 4 was set by comparing the time to the actuation start time with the fourth threshold value time, that is, in correspondence with the available time before crash. In addition to this, the actuation rise time of the seat belt reeling-in device 4 may be set on the basis of the information relating to deceleration rate discussed earlier. For example, when a deceleration rate obtained from information relating to deceleration rate is greater than a predetermined deceleration rate a short actuation rise time is set, and when the deceleration rate is lower than the predetermined deceleration rate an ordinary actuation rise time is set. Or, the actuation rise time may be changed continuously in proportion with the size of the deceleration rate.

When the deceleration rate is high, the actual crash time is later than the estimated crash time, but when the driver carries out a braking operation or a steering operation such that the deceleration rate increases, the situation is often one in which there is a high danger of a crash. Therefore, when the deceleration rate is high it is desirable for it to be inferred that there is a high danger of a crash and for reeling-in of the seat belt to be completed swiftly in preparation for the crash.

When the actuation rise time is set in correspondence with the size of the deceleration rate like this, processing for setting a final tension of the seat belt in correspondence with the size of the deceleration rate, which will be further discussed later, can be preferably carried out. That is, when the deceleration rate is large and a large final tension is set, because simultaneously the actuation rise time of the seat belt is also set to the short time, the time taken to reach the final tension can be shortened.

Next, processing for setting the size of the tension finally applied to the seat belt on the basis of information relating to deceleration rate will be described. This processing is carried out in a step S116.

In this preferred embodiment, to make the explanation simple, the final tension of the seat belt reeling-in device 4 will be set to either of two levels. To set the final tension of the seat belt to either an ordinary tension (for example half of a maximum tension) and a strong tension (for example the maximum tension), it is determined whether or not a deceleration rate obtained from the information relating to deceleration rate is above a predetermined deceleration rate. Then, when the deceleration rate is above the predetermined deceleration rate, because it can be inferred that the situation is one in which the danger of a crash is high, the final tension of the seat belt is set to the strong tension. On the other hand, when the deceleration rate is smaller than the predetermined deceleration rate, the final tension of the seat belt is set to an ordinary tension. When this approach is adopted, the tension of the seat belt can be made strong selectively, only when it is estimated that the danger of a crash is high. When the final tension of the seat belt is made the strong tension, the saturation current value finally supplied to the motor of the seat belt reeling-in device 4 is made large, and when it is made the ordinary tension the saturation current value is made small.

Whereas in the example described above the final tension of the seat belt was set to either of two levels, it is also possible for the final tension of the seat belt to be set to any of three levels or continuously in correspondence with the size of the deceleration rate.

Next, in step S118, it is determined whether or not the start timer set in step S112 has finished counting. If the start timer has not finished counting, processing stands by until it has finished counting, i.e. until the actuation start time is reached. When the start timer finishes counting and the actuation start time is reached, processing proceeds to step S120. When the actuation start time calculated in step S110 is a time earlier than the present time, because a numerical value (for example 0) corresponding to the actuation start time is set in the register of the start timer in step S112, step S120 is reached via step S114 to step S118 with an almost negligible delay time.

In step S120, current supply control of the motor of the seat belt reeling-in device 4 is carried out on the basis of the actuation rise time (current increase rate) selected in step S114 and the final tension (saturation current value) selected in step S116, and processing proceeds to step S122.

In step S122, it is determined whether or not the stop timer set in step S112 has finished counting. If the stop timer has not finished counting, processing returns to step S120 and current supply control is continued. When the stop timer has finished counting, processing proceeds to step S124.

In step S124, at the end of current supply to the motor, if the seat belt reeling-in device 4 has a mechanism for restoring the reeled-in seat belt to its original position, current supply to the motor is simply ended. However, when the current supply simply ending does not restore the reeled-in seat belt to its original position, a current for turning the motor in the reverse direction is supplied to slacken the seat belt, and processing returns to step S102.

Figure 4:
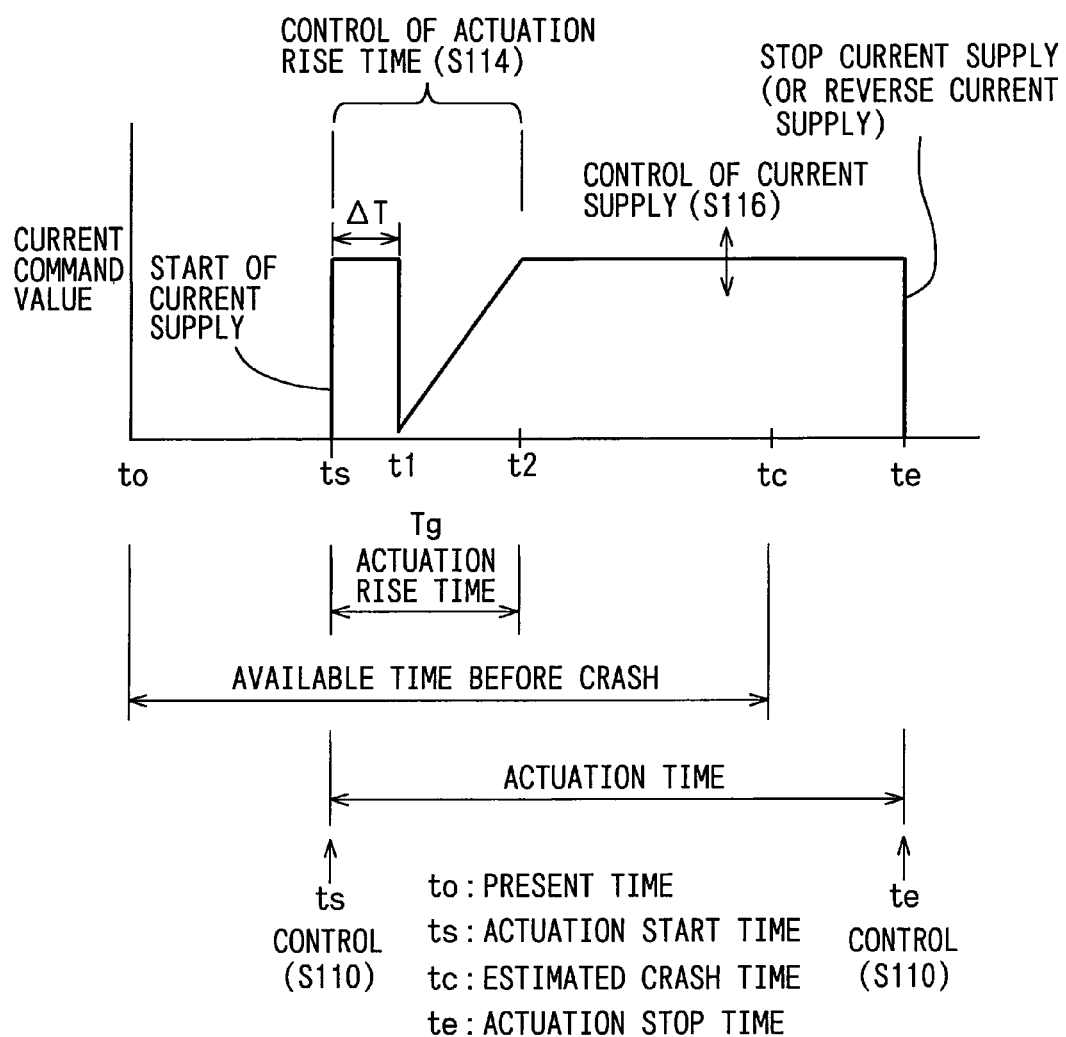
FIG. 4 is a timing chart showing change of a command value of a current supplied to a motor of a seat belt reeling-in device under the control operation of the calculation and control part of FIG. 1.

Current command values to the motor of the seat belt reeling-in device 4 in the control described above will now be explained on the basis of the timing chart shown in FIG. 4.

The period ΔT is an initial short full-load drive period at the start of current supply to the motor. The period between times t1 and t2 after that is a period of increasing of the current at a predetermined rate of increase, and in this period the tension of the seat belt increases at a predetermined rate of increase. Accordingly, the actuation rise time Tg referred to in this invention refers to the period from the actuation start time ts to the time t2. And, at the time of maximum current supply of when the actuation rise time has been set to a short time, a fixed maximum current is supplied from the time t1 to the time t2.

When at the time t2 the actuation rise completes, thereafter current supply control is carried out in which a saturation current value is supplied to the motor up to a current stop time te. This saturation current value is varied in correspondence with the final tension of the seat belt set in step S116.

The present invention is not limited to the preferred embodiment described above, and various changes and modifications can be made within the scope of the invention.

For example, in the preferred embodiment described above a detected value from a sensor detecting a vehicle-driving operation of the driver or a state of the vehicle arising as a result thereof was used as information relating to deceleration rate. However, alternatively of course a deceleration rate can be calculated from a change of relative speed and this calculated deceleration rate used to perform correction of the actuation start time of the seat belt reeling-in device 4 and setting of the actuation rise time and final tension.

The invention claimed is:

1. A safety device for a vehicle comprising:
a distance information detecting element for detecting a distance to a crash object and a relative speed relative to the crash object;
a passenger protection element for lightening crash damage by completing a transition to a passenger protecting state after a predetermined actuation rise time elapses from an actuation start time;
a calculation and control element for ordering a start of actuation of the passenger protection element, wherein actuation is started when an available time before a crash, which is the time to an estimated crash time calculated on the basis of the detected distance and relative speed, has fallen to a predetermined first threshold time, and wherein the predetermined first threshold time is set to be equal to or longer than said actuation rise time; and
a deceleration rate information detecting element for detecting deceleration rate information relating to a deceleration rate that is a rate of change of said relative speed, said calculation and control element corrects said actuation start time on the basis of said deceleration rate information.

2. A safety device for a vehicle according to claim 1, wherein said calculation and control element corrects said actuation start time on the basis of said deceleration rate information so that said actuation start time is made later when said deceleration rate is high compared to when it is low.

3. A safety device for a vehicle according to claim 1, wherein said deceleration rate information detecting element detects at least one of a vehicle-driving operation of a vehicle driver and a vehicle state resulting from the vehicle-driving operation, and said calculation and control element obtains the deceleration rate information on the basis of at least one of said vehicle-driving operation and vehicle state resulting from the vehicle-driving operation.

4. A safety device for a vehicle according to claim 3, wherein said calculation and control element calculates an amount of change in at least one of said vehicle-driving operation and vehicle state resulting from the vehicle-driving operation, and obtains said deceleration rate information from said amount of change.

5. A safety device for a vehicle according to claim 3, wherein said deceleration rate information detecting element includes at least one among a brake depression sensor for detecting a depression amount of a brake pedal, a brake pressure sensor for detecting a brake pressure, an acceleration sensor for detecting the deceleration rate of the vehicle, a yaw rate sensor for detecting a yaw rate, and a steering angle sensor for detecting a steering angle.

6. A safety device for a vehicle according to claim 1, wherein said calculation and control element corrects said actuation start time on the basis of the deceleration rate information detected by said deceleration rate information detecting element, during a time period from when said available time before crash reaches a second threshold time longer than said first threshold time to when it reaches said first threshold time.

7. A safety device for a vehicle according to claim 1, wherein said passenger protection element is a seat belt reeling-in device.

8. A safety device for a vehicle comprising:
a distance information detecting element for detecting a distance to a crash object and a relative speed relative to the crash object;
a passenger protection element for lightening crash damage by completing a transition to a passenger protecting state after a predetermined actuation rise time elapses from an actuation start time;
a calculation and control element for ordering a start of actuation of the passenger protection element, wherein actuation is started when an available time before a crash, which is the time to an estimated crash time calculated an the basis of the detected distance and relative speed, has fallen to a predetermined first threshold time, and wherein the predetermined first threshold time is set to be equal to or longer than said actuation rise time, and wherein the calculation and control element orders a stop of actuation at a time later than said estimated crash time by a predetermined third threshold time; and
a deceleration rate information detecting element for detecting deceleration rate information relating to a deceleration rate that is a rate of change of said relative speed, said calculation and control element corrects said actuation stop time on the basis of said deceleration rate information.

9. A safety device for a vehicle according to claim 8, wherein said calculation and control element corrects said actuation stop time on the basis of said deceleration rate information so that said actuation stop time is made earlier when said deceleration rate is low compared to when it is high.

10. A safety device for a vehicle according to claim 8, wherein said deceleration rate information detecting element detects at least one of a vehicle-driving operation of a vehicle driver and a vehicle state resulting from the vehicle-driving operation, and said calculation and control element obtains the deceleration rate information on the basis of at least one of said vehicle-driving operation and vehicle state resulting from the vehicle-driving operation.

11. A safety device for a vehicle according to claim 10, wherein said calculation and control element calculates an amount of change in at least one of said vehicle-driving operation and vehicle state resulting from the vehicle-driving operation, and obtains said deceleration rate information from said amount of change.

12. A safety device for a vehicle according to claim 10, wherein said deceleration rate information detecting element includes at least one among a brake depression sensor for detecting a depression amount of a brake pedal, a brake pressure sensor for detecting a brake pressure, an acceleration sensor for detecting the deceleration rate of the vehicle, a yaw rate sensor for detecting a yaw rate, and a steering angle sensor for detecting a steering angle.

13. A safety device for a vehicle according to claim 8, wherein said calculation and control element corrects said actuation stop time on the basis of the deceleration rate information detected by said deceleration rate information detecting element, during a time period from when said available time before crash reaches a second threshold time longer than said first threshold time to when it reaches said first threshold time.

14. A safety device for a vehicle according to claim 8, wherein said passenger protection element is a seat belt reeling-in device.

15. A safety device for a vehicle according to claim 8, wherein said calculation and control element corrects said actuation start time on the basis of said deceleration rate information, and calculates said actuation stop time by adding the corrected actuation start time to a predetermined actuation time of said passenger protection element.

16. A safety device for a vehicle comprising:
a distance information detecting element for detecting a distance to a crash object and a relative speed relative to the crash object;
a passenger protection element for lightening crash damage by completing a transition to a passenger protecting state after a predetermined actuation rise time elapses from an actuation start time;
a calculation and control element for ordering a start of actuation of the passenger protection element, wherein actuation is started when an available time before a crash, which is the time to an estimated crash time calculated on the basis of the detected distance and relative speed, has fallen to a predetermined first threshold time, and wherein the predetermined first threshold time is set to be equal to or longer than said actuation rise time; and
a deceleration rate information detecting element for detecting deceleration rate information relating to a deceleration rate that is a rate of change of said relative speed, said calculation and control element adjusts a strength of a protection actuation of said passenger protection element on the basis of said deceleration rate information.

17. A safety device for a vehicle according to claim 16, wherein said calculation and control element adjusts the strength of the protection actuation on the basis of said deceleration rate information so as to make the protection actuation of the passenger protection element stronger when the deceleration rate is high compared to when it is low.

18. A safety device for a vehicle according to claim 16, wherein said passenger protection element is a seat belt reeling-in device, and said calculation and control element adjusts the strength of the protection actuation by changing a tension of a seat belt.

19. A safety device for a vehicle according to claim 16, wherein said deceleration rate information detecting element detects at least one of a vehicle-driving operation of a vehicle driver and a vehicle state resulting from the vehicle-driving operation, and said calculation and control element obtains the deceleration rate information on the basis of at least one of said vehicle-driving operation and vehicle state resulting from the vehicle-driving operation.

20. A safety device for a vehicle according to claim 19, wherein said calculation and control element calculates an amount of change in at least one of said vehicle-driving operation and vehicle state resulting from the vehicle-driving operation, and obtains said deceleration rate information from said amount of change.

21. A safety device for a vehicle according to claim 19, wherein said deceleration rate information detecting element includes at least one among a brake depression sensor for detecting a depression amount of a brake pedal, a brake pressure sensor for detecting a brake pressure, an acceleration sensor for detecting the deceleration rate of the vehicle, a yaw rate sensor for detecting a yaw rate, and a steering angle sensor for detecting a steering angle.

22. A safety device for a vehicle according to claim 16, wherein said calculation and control element adjusts the protection actuation of said passenger protection element on the basis of the deceleration rate information detected by said deceleration rate information detecting element, during a time period from when said available time before crash reaches a second threshold time longer tan said first threshold time to when it reaches said first threshold time.

23. A safety device for a vehicle comprising:
a distance information detecting element for detecting a distance to a crash object and a relative speed relative to the crash object;
a passenger protection element for lightening crash damage by completing a transition to a passenger protecting state after a predetermined actuation rise time elapses from an actuation start time; and
a calculation and control element for ordering a start of actuation of the passenger protection element, wherein actuation is started when an available time before a crash, which is the time to an estimated crash time calculated on the basis of the detected distance and relative speed, has fallen to a predetermined first threshold time, and wherein to predetermined first threshold time is set to be equal to or longer than said actuation rise time, and further wherein said calculation and control element actuates said passenger protection element so as to make the actuation rise time shorter when said available time before crash is short compared to when it is long.

24. A safety device for a vehicle according to claim 23, wherein said calculation and control element determines a length of said available time before crash depending on whether or not an available time to said actuation start time is equal to of longer than a predetermined fourth threshold time.

25. A safety device for a vehicle according to claim 24, wherein said predetermined fourth threshold time is set to a positive value including 0.

26. A safety device for a vehicle according to claim 23, wherein said passenger protection element is a seat belt reeling-in device, and said calculation and control element adjusts said actuation rise time by changing a reeling-in speed of a seat belt.

27. A safety device for a vehicle according to claim 23, further comprising a deceleration rate information detecting element for detecting deceleration rate information relating to a deceleration rate that is a rate of change of said relative speed, and wherein said calculation and control element adjusts said actuation rise time on the basis of said deceleration rate information.

28. A safety device for a vehicle according to claim 27, wherein said calculation and control element adjusts said actuation rise time on the basis of said deceleration rate information so as to make said actuation rise time shorter when said deceleration rate is high compared to when it is low.

29. A safety device far a vehicle according to claim 27, wherein said deceleration rate information detecting element detects at least one of a vehicle-driving operation of a vehicle driver and a vehicle state resulting from the vehicle-driving operation, and said calculation and control element obtains the deceleration rate information on the basis of at least one of said vehicle-driving operation and vehicle state resulting from the vehicle-driving operation.

30. A safety device for a vehicle according to claim 29, wherein said calculation and control element calculates an amount of change in at least one of said vehicle-driving operation end vehicle state resulting from the vehicle-driving operation, and obtains said deceleration rate information from said amount of change.

31. A safety device for a vehicle according to claim 29, wherein said deceleration rate information detecting element includes at least one among a brake depression sensor for detecting a depression amount of a brake pedal, a brake pressure sensor for detecting a brake pressure, an acceleration sensor for detecting the deceleration rate of the vehicle, a yaw rate sensor for detecting a yaw rate, and a steering angle sensor for detecting a steering angle.

* * * * *

UNITED STATES PATENT AND TRADEMARK OFFICE
CERTIFICATE OF CORRECTION

PATENT NO. : 7,343,235 B2  Page 1 of 1
APPLICATION NO. : 10/540264
DATED : March 11, 2008
INVENTOR(S) : Kazuyoshi Isaji and Hideki Kato It is certified that error appears in the above-identified patent and that said Letters Patent is hereby corrected as shown below:

Title Page

Correct Item (73), as Assignee's name:

"DENSO" CORPORATION, Kariya (JP)
Toyota Jidosha Kabushiki Kaisha, Toyota (JP)

Signed and Sealed this

Fifth Day of August, 2008

JON W. DUDAS
*Director of the United States Patent and Trademark Office*